United States Patent
Flury et al.

(10) Patent No.: US 11,973,665 B2
(45) Date of Patent: Apr. 30, 2024

(54) TECHNIQUE FOR REMOTE ADMINISTRATION OF A DEVICE BY AN ADMINISTRATION SERVER

(71) Applicant: Orange, Issy-les-Moulineaux (FR)

(72) Inventors: Thibaud Flury, Chatillon (FR); Emna Mezghani, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/793,781

(22) PCT Filed: Jan. 18, 2021

(86) PCT No.: PCT/FR2021/050079
§ 371 (c)(1),
(2) Date: Jul. 19, 2022

(87) PCT Pub. No.: WO2021/148741
PCT Pub. Date: Jul. 29, 2021

(65) Prior Publication Data
US 2023/0064002 A1 Mar. 2, 2023

(30) Foreign Application Priority Data
Jan. 20, 2020 (FR) ...................................... 2000541

(51) Int. Cl.
*H04L 41/28* (2022.01)
*H04L 41/042* (2022.01)

(52) U.S. Cl.
CPC ............ *H04L 41/28* (2013.01); *H04L 41/042* (2013.01)

(58) Field of Classification Search
CPC ... H04L 41/28; H04L 41/042; H04L 41/0893; H04L 43/028; H04L 12/287;
(Continued)

(56) References Cited

U.S. PATENT DOCUMENTS 8,850,060 B1 * 9/2014 Beloussov .......... H04L 63/1408
718/1
9,843,624 B1 * 12/2017 Taaghol .................. G06F 21/53
(Continued)

FOREIGN PATENT DOCUMENTS

WO 2016007813 A1 1/2016

OTHER PUBLICATIONS

International Search Report dated Apr. 9, 2021 for corresponding International Application No. PCT/FR2021/050079, dated Jan. 18, 2021.
(Continued)

*Primary Examiner* — Thu Ha T Nguyen
(74) *Attorney, Agent, or Firm* — David D. Brush; Westman, Champlin & Koehler, P.A.

(57) ABSTRACT

A technique for remote administration of a device to be administered. A relay device receives a request to activate a filter for administration of the device to be administered from a referring administration server. This activation request includes information relating to rights assigned to a third-party administration server for delegating the administration of the device to be administered. The relay device then applies a filter to a message received from the third-party administration server intended for the device to be administered, the message received from the third-party administration server being filtered by the filter when it does not comply with the rights assigned to the third-party administration server.

10 Claims, 2 Drawing Sheets

(58) Field of Classification Search
CPC ............ H04L 12/2872; H04L 12/2874; H04L 12/2876; H04L 51/212; H04L 63/0227; H04L 63/20; H04L 2012/5626
USPC ................................................ 709/223, 224
See application file for complete search history.

(56) References Cited

U.S. PATENT DOCUMENTS

| | | | | |
|---|---|---|---|---|
| 9,858,559 | B2* | 1/2018 | Raleigh | H04M 15/8038 |
| 9,967,242 | B2* | 5/2018 | Parthasarathy | H04L 63/101 |
| 11,489,845 | B1* | 11/2022 | Feng | G06F 9/451 |
| 11,611,482 | B1* | 3/2023 | Litty | H04L 47/22 |
| 2004/0260778 | A1* | 12/2004 | Banister | H04L 51/212 |
| | | | | 709/224 |
| 2006/0120305 | A1 | 6/2006 | Van Den Bosch et al. | |
| 2006/0200527 | A1* | 9/2006 | Woods | H04L 51/212 |
| | | | | 709/206 |
| 2010/0281535 | A1* | 11/2010 | Perry, Jr. | H04L 51/212 |
| | | | | 715/752 |
| 2011/0113094 | A1* | 5/2011 | Chunilal | G06Q 20/1235 |
| | | | | 709/204 |
| 2012/0005542 | A1* | 1/2012 | Petersen | H04L 63/1425 |
| | | | | 714/48 |
| 2014/0140213 | A1* | 5/2014 | Raleigh | H04L 43/062 |
| | | | | 370/235 |
| 2016/0210578 | A1* | 7/2016 | Raleigh | G06Q 30/04 |
| 2018/0089278 | A1* | 3/2018 | Bhattacharjee | H04L 43/12 |
| 2018/0375877 | A1* | 12/2018 | Jakobsson | G06F 16/955 |
| 2019/0089748 | A1* | 3/2019 | Manor | H04L 41/0893 |
| 2020/0067861 | A1* | 2/2020 | Leddy | G06F 21/6245 |
| 2020/0259792 | A1* | 8/2020 | Devarajan | G06F 21/554 |
| 2020/0259793 | A1* | 8/2020 | Pangeni | H04L 41/5006 |
| 2021/0117425 | A1* | 4/2021 | Rao | H04L 9/0866 |
| 2021/0243142 | A1* | 8/2021 | Treat | H04L 51/04 |
| 2022/0181887 | A1* | 6/2022 | Baldasare | G08B 21/182 |
| 2022/0239578 | A1* | 7/2022 | Raleigh | H04L 43/026 |
| 2022/0360608 | A1* | 11/2022 | Raleigh | H04L 47/2408 |
| 2023/0064002 | A1* | 3/2023 | Flury | H04L 41/28 |
| 2023/0188605 | A1* | 6/2023 | Barry | H04L 63/10 |
| | | | | 340/5.2 |

OTHER PUBLICATIONS

Written Opinion of the International Searching Authority dated Apr. 9, 2021 for corresponding International Application No. PCT/FR2021/050079, filed Jan. 18, 2021.
"OMA Device Management Protocol", Approved Version 2.0—Feb. 9, 2016, Open Mobile Alliance OMA-TS-DM_Protocol-V2_0-20160209-A.
"TR-181 Device Data Model", Broadband forum, Technical Report, Issue: 2 Amendment 13, Sep. 2019.
"TR-106 Data Model Template for CWMP Endpoints and USP Agents", Broadband forum, Technical Report, Issue: 1 Amendment 8, Mar. 2018.
"TR-069 CPE WAN Management Protocol", Broadband forum, Technical Report, Issue: 1 Amendment 6, Mar. 2018, CWMP Version: 1.4.
English translation of the Written Opinion of the International Searching Authority dated Apr. 19, 2021 for corresponding International Application No. PCT/FR2021/050079, filed Jan. 18, 2021.

* cited by examiner

TECHNIQUE FOR REMOTE ADMINISTRATION OF A DEVICE BY AN ADMINISTRATION SERVER

CROSS-REFERENCE TO RELATED APPLICATIONS

This Application is a Section 371 National Stage Application of International Application No. PCT/FR2021/050079, filed Jan. 18, 2021, which is incorporated by reference in its entirety and published as WO 2021/148741 A1 on Jul. 29, 2021, not in English.

FIELD OF THE DISCLOSURE

The invention relates to the general field of telecommunications.

The invention relates, more particularly, to a technique for remote management of a device by an administration server.

BACKGROUND OF THE DISCLOSURE

In order to guarantee quality services, it is preferable for a network operator to be able to manage devices remotely.

The remote management of devices notably requires:
the managed devices to be detected and known, for example their serial numbers, their hardware and software versions;
these devices to be supervised, for example by obtaining supervision information and performance indicators.

The following relates to the case of a local network. In this network, an access gateway notably allows devices located at a client site to access a wide-area communications network or WAN, such as the Internet. For a local network, these devices correspond for example to the access gateway, a TV decoder or "Set-Top-Box", a mobile terminal. In the context of a home automation network, these devices could also be domestic appliances, alarm systems, sensors.

The remote management of the devices of a local network relies for example on a technical report drawn up by the Broadband Forum, TR-069 "CPE WAN Management Protocol". These devices are also referred to as CPE, for "Customer Premises Equipment". This technical report defines a CWMP protocol, specifying the communications between an administration server, called auto-configuration server, or ACS, and a remote device. The CWMP protocol defines a mechanism which notably allows a secure auto-configuration of the remote devices and other management functions for these devices.

It is notably possible for the operator of the network to carry out remote interventions such as:
updating the software or the firmware of a device, when an upgrade of the software version or of the firmware is required;
performing a diagnostic when a device has a malfunction;
installing and dynamically configuring new services;
supervising the state of operation and the performance characteristics of a device.

Some devices implement several services. In addition, the number of devices to be managed is increasing owing to the integration of connected objects within the communications networks. It is thus becoming more and more difficult for a network operator to manage these various devices and their various services remotely. Indeed, the architecture provided is based on a centralized view of the management. The protocols implemented are centralized and impose on the referring administration server and on the network operator to have a global vision of the functional perimeter of the devices. Only the referring administration server disposes of all of the rights on a device that it is managing. Moreover, these connected objects continually acquire new functionalities, which leads to an updating of the onboard software.

SUMMARY

One of the aims of the invention is to overcome drawbacks of the prior art and/or to bring improvements to them.

According to a first aspect, one subject of the invention is a method for remote management of a device to be managed. This method comprises:
receipt by a relay device of a request for activation of a filter for the administration of said device coming from a referring administration server, said activation request comprising information relating to rights assigned to a third-party administration server for a delegation of the management of the device to be managed;
application of the filter by the relay device to a message received from the third-party administration server destined for the device to be managed, the message received of the third-party administration server being filtered by the filter when it does not conform to the rights assigned to the third-party administration server.

The technique provided thus allows rights to be delegated to a third-party administration server in order to carry out management and configuration operations on devices. These devices are for example connected to the local network of a client of the operator, in an environment of trust. The relay device is for example an access gateway allowing an access to a wide-area communications network for devices of the local network. The technique provided thus allows a relay function to be implemented dynamically on the relay device in the form of a filter which will allow it to be verified that the exchanges between the third-party administration server and the device to be managed are indeed carried out within the perimeter of the delegation, in other words according to the rights which are assigned to the third-party administration server.

The filter may for example verify that the exchanges between the third-party administration server and the device to be managed truly relate to a given service. The third-party administration server then disposes of rights for performing administration and configuration operations for this service. By way of illustrative example, this could be a service such as the Connected Home. The referring administration server then delegates to a third-party administration server the administration of this service for the devices concerned in the local network. This allows the referring administration server to be off-loaded to the third-party administration server.

The technique provided is implemented in an environment which guarantees a level of security and of trust.

A relay device may implement several filters, each of these filters being associated with a particular device.

A third-party server may be dedicated to the management of an assembly of devices of the same type.

The technique provided also allows the administration architecture implemented in the networks of the operators to be upgraded to a multi-server architecture such as that currently in the process of standardization by bodies such as the Broadband Forum (USP for "User Services Platform") or else the Open Mobile Alliance OMA (LwM2M for "Lightweight Machine to Machine").

The technique provided also allows the handling of the management of devices that are increasingly numerous by the administration architecture implemented within the networks of the operators.

The various embodiments or their features mentioned hereinafter may be added independently or in combination with one another to the method for remote management of a device such as previously defined.

In one particular embodiment, the filter is furthermore applied to a message received from the device to be managed and destined for the third-party administration server, the message received being filtered by the filter when it does not conform to the rights assigned to the third-party administration server.

This allows the conformity of the messages to be verified with respect to the assigned rights in both directions of communication, from the third-party server to the device to be managed and vice versa.

In one particular embodiment, the activation request comprises a delegation period, at the end of which the filter is disabled.

This allows the delegation to be limited in time. At the end of this delegation period, the device is once again managed by the referring administration server.

In one particular embodiment, the activation request comprises a condition associated with the relay device and the filter is not enabled or is disabled when said condition is not met.

This avoids consuming the resources of the relay device, for example its processor load or furthermore its energy resources, when its resources do not verify the requested condition. In this case, asking the relay device to enable the relay function would put it in undesirable operating conditions.

In one particular embodiment, in order to disable the filter, the method furthermore provides for the relay device to send to the device to be managed a change of administration server to the referring administration server.

This allows the relay device to switch the management of the device into the nominal situation, in other words management of the device by the referring administration server.

In one particular embodiment, the information relating to rights assigned to the third-party administration server comprises a part of a data model exposed by the device to be managed, for which the third-party administration server disposes of said rights.

This allows the relay device to know exactly the delegation that is given to the third-party administration server. Reading or writing rights may then be associated with a part of the data model exposed by the device. The relay device deduces from this the filter to be applied and dynamically instantiates this filter responsible for verifying the correct usage of these rights.

In one particular embodiment, the information relating to rights assigned to a third-party administration server furthermore comprises an authorized management operation.

This allows details to be provided operation by operation. The given delegation can thus be defined very precisely.

In one particular embodiment, the filter blocks a message received when it does not conform to the rights assigned to the third-party administration server or eliminates parts of the received message not conforming to the rights assigned to the third-party administration server.

This filter may be applied to the direction of communication of the third-party administration server to the device to be managed and also to both directions of communication between the third-party administration server and the device to be managed.

According to a second aspect, the invention relates to a relay device, configured so as to be remotely managed by a referring administration server. This relay device comprises:
  a receiver module, configured for receiving a request for activation of a filter for the management of a device to be managed coming from the referring administration server, said activation request comprising information relating to rights assigned to a third-party administration server for a delegation of the management of the device to be managed;
  a filtering module, configured for applying a filter to a message received from the third-party administration server destined for the device to be managed, the message received from the third-party administration server being filtered by the filter when it does not conform to the rights assigned to the third-party administration server.

The advantages stated for the method for remote management of a device according to the first aspect are directly transposable to a relay device.

The relay device may of course comprise, in structural terms, the various features relating to the method for remote management of a device such as previously described, which may be combined or taken in isolation.

According to a third aspect, the invention relates to an administration system comprising a relay device according to the second aspect, a referring administration server and a third-party administration server The advantages stated for the method for remote management of a device according to the first aspect are directly transposable to an administration system.

This administration system may of course comprise, in structural terms, the various features relating to the method for remote management of a device such as described previously, which may be combined or taken in isolation.

According to a fourth aspect, the invention relates to a program for a relay device, comprising program code instructions designed to control the execution of the steps of the method for remote management of a device to be managed previously described implemented by a relay device, when this program is executed by this relay device and a recording medium readable by a relay device on which a program for a relay device is recorded.

The advantages stated for the method for remote management of a device to be managed according to the first aspect are directly transposable to the program for a relay device and to the recording medium.

BRIEF DESCRIPTION OF THE DRAWINGS

The technique for remote management of a device will be better understood by means of the following description of particular embodiments, with reference to the appended drawings in which.

DETAILED DESCRIPTION OF ILLUSTRATIVE EMBODIMENTS

Figure 1:
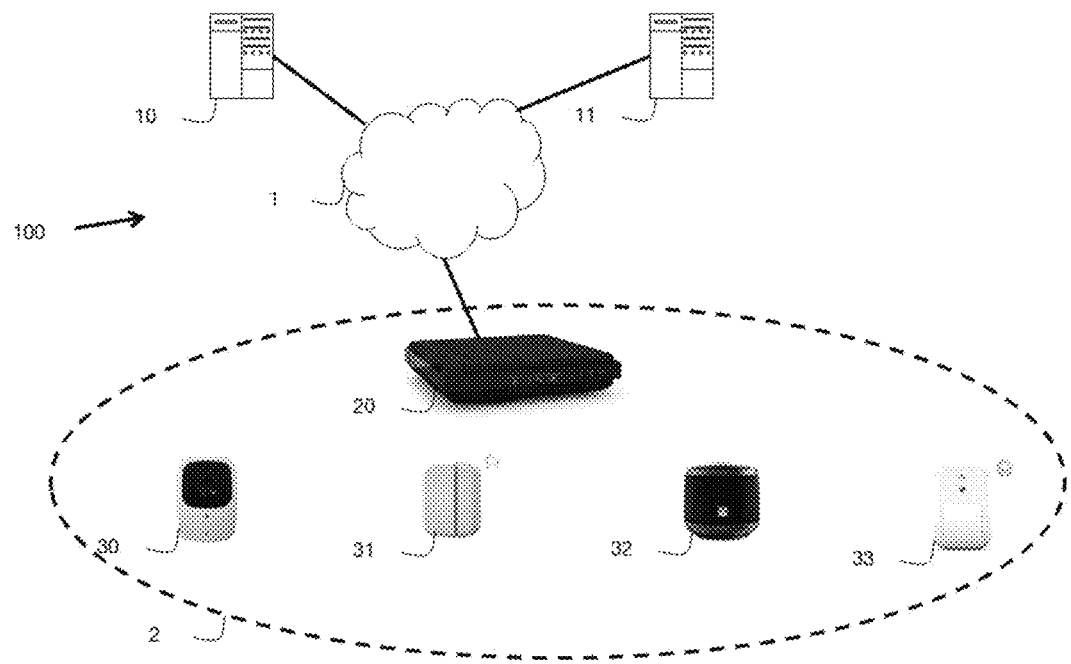
FIG. 1 shows an environment in which the method for remote management of a device is implemented in one particular embodiment.

The environment shown in FIG. 1 corresponds to that of the remote management of devices of a local network. It is given here by way of illustration, but the technique for remote management may be implemented in other environments. FIG. 1 shows a system 100 in which the method for remote management of a device is implemented in one particular embodiment. This system 1 comprises:
 a main or referring administration server 10;
 a third-party or delegated administration server 11;
 a device 20, called relay device.

FIG. 1 shows a plurality of devices of a local network remotely managed by the referring administration server 10. This management by the referring server corresponds to a nominal situation. The IP protocol (for "Internet Protocol") is used by the devices for communicating with one another within the local network and also for communicating with a wide-area communications network or WAN, such as the Internet, not shown in FIG. 1.

For the environment shown in FIG. 1, local communications network is understood to mean a network of the LAN type. This network may in particular be a home network or a corporate network. An access gateway 20 is arranged in order to provide devices of the local network with an access to the wide-area network (for example the Internet) via an access network. The access network 1 is for example an access network xDSL (for "Digital Subscriber Line", the x indicating that it could be a network ADSL, HDSL, VDSL, etc.). It could also be a network FTTH (for "Fiber To The Home"). No limitation is attached to the type of the access network.

The local network 2 may be based on various access technologies such as wired technologies of the Ethernet type, according to the standard IEEE 802.3, wireless technologies of the Wi-Fi type, according to the standard IEEE 802.11, Zwave, Zigbee, or alternatively by power line communication PLC. It goes without saying that these various access technologies may co-exist.

In the following, the access gateway 20 plays the role of a relay device in the framework of the remote management of one of the devices of the local network. More precisely, the access gateway implements a relay function for the management of the device to be managed by a third-party administration server.

The devices of a local network 2 may be any kind of devices, for example home devices, disposing of a wired or wireless network connection. These could for example be a camera 30, a door or window opening detector 31, a voice-operated assistant 32, a motion detector 33, a TV decoder ("Set-Top Box"), a play station, domestic appliances, etc. In the following, the devices are limited to those managed remotely by the referring administration server 10. Such devices contribute to the implementation of a service provided by the operator at the client's home. In this respect, they provide a service to a user. By way of illustration, the following considers the framework of a home local network. No limitation is attached to this particular example and the description that follows is readily transposable to a local network of the corporate network type. It is also transposable to any type of device to be managed remotely.

The referring administration server 10 allows the operator of the communications network to manage and supervise devices, notably devices belonging to local networks, including the access gateway 20 and the devices of the local network 30-33. The referring administration server 10 is also referred to as auto-configuration server (or ACS).

In the embodiment described, the referring administration server 10 communicates with the devices of the local network 2 with a view to their management according to the remote management protocol CWMP ("CPE WAN Management Protocol") defined in the technical report TR-069 drawn up by the Broadband Forum, for example the Amendment 6, dated March 2018. The data models used by the CWMP protocol are defined in the technical report TR-106 "Data Model Template for CWMP Endpoints and USP Agents", for example the version Issue 1 Amendment 8, dated March 2018 and in the technical report TR-181 "Device Data Model for TR-069", for example the version Issue 2 Amendment 13, dated September 2019. These data models are implemented in the form of an XML tree structure. The CWMP protocol is based on the Internet protocol, more precisely on TCP/IP (for "Transmission Control Protocol"). The devices are also referred to as CPE, for "Customer Premises Equipment".

The embodiments are described for devices to be managed located within a local network and for a particular management protocol. No limitation is attached to this exemplary embodiment. In other embodiments, it is for example possible to implement the specification OMA-Device Management defined by the OMA (for "Open Mobile Alliance") organization for the management of mobile terminals, for example the approved version 2.0.

By means of the CWMP protocol, the referring administration server 10 may notably:
 obtain and manage remotely the configuration of a device;
 initiate diagnostic tests;
 download software or firmware files and
 manage events.

In the case of an access gateway, the referring administration server 10 may also obtain information relating to the devices which are connected to the access gateway.

The remote management application uses the CWMP protocol and is based on protocol standards TCP/IP, SSL/TLS (for "Secure Sockets Layer/Transport Layer Security"), HTTP (for "HyperText Transfer Protocol"), SOAP (for "Simple Object Access Protocol"), RPC (for "Remote Procedure Call").

FIG. 1 also shows a third-party administration server 11. This third-party server 11 can perform the same administration operations as the referring administration server 10. However, these operations are limited according to the rights that the referring administration server 10 delegates to it.

The data model exposed by a device is structured in the form of a tree. For each leaf of the tree, reading and/or writing rights are assigned to the third-party administration server 11 by the referring administration server 10. This is a delegation carried out by the referring server 10 to the third-party server 11. Once this delegation has been carried out, the third-party server 11 disposes of the rights assigned and can carry out administration operations within the limit of these rights. These administration operations are for example: reading or writing a parameter, download command, remote action such as a reboot, etc. An administration operation outside of the assigned rights is not authorized.

In one particular embodiment, the referring server 10 also specifies which are the administration operations for which the third-party server 11 disposes from the delegation. In this embodiment, an administration operation which is not specified is not authorized.

In one particular embodiment, a delegation period is also defined, upon expiry of which the referring server 10 recovers all of the rights on the device (including the rights that it had delegated to the third-party server 11).

In one particular embodiment, a condition is associated with the relay device. This condition corresponds for example to a required battery level, a threshold of processor resources, an available bandwidth, a threshold of available memory resources, a number of operations authorized, etc. This or these conditions may be verified:

during the activation of the relay function and, in this case, the activation is refused;

or else, once the relay function has been activated, and in this case the relay function is disabled, the referring server 10 recovering all of the rights on the device.

The verification of these conditions aims to guarantee that the relay device will not undergo any degradation of its quality of service, owing to the implementation of the relay function.

The method for remote management of a device will now be described in relation with FIGS. 2A and 2B in a system 100 such as shown in FIG. 1. Subsequently, the focus is on the access gateway 20, playing the role of the relay device. The device to be managed is the device 30.

Figure 2A:
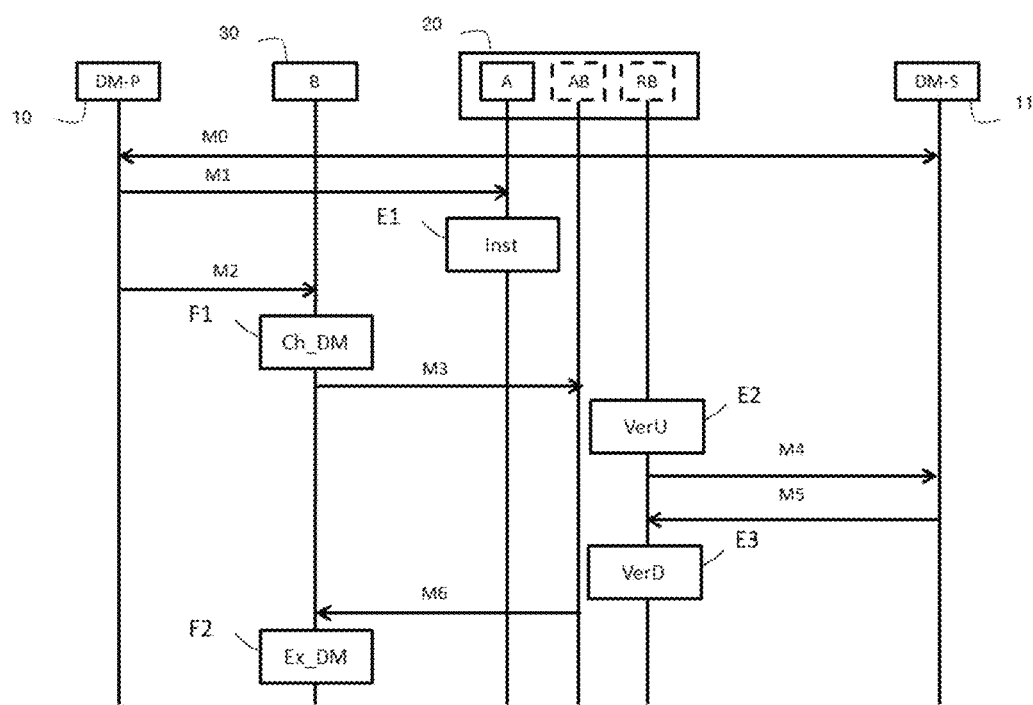
FIG. 2A illustrates steps of a method for remote management of a device according to one particular embodiment.

Steps of the method for remote management of the device 30 are described in relation with FIG. 2A according to one particular embodiment.

In FIG. 2A, the device to be managed 30 is denoted B. This device 30 is in the nominal situation managed by the referring server 10. The relay device 20 then comprises three functional modules:

a first administration module, denoted A, for the management of the relay device 20 in cooperation with the referring server 10;

a second relay administration module, denoted RB, which plays the role of a client with respect to the third-party administration server 11 for managing the device to be managed B;

a third relay administration module toward the device to be managed B, denoted AB, which plays the role of an administration server for managing the device to be managed B.

The second and third relay administration modules form the relay function implemented by the relay device 20. In the nominal situation for the management of the device 30, the second and third relay administration modules are not instantiated.

An initialization phase, symbolized by an exchange M0 in FIG. 1A, is implemented by the referring administration server 10 and the third-party administration server 11. This phase allows to be defined, depending on the administration operation to be carried out and the device concerned by the delegation, the rights assigned by the referring server 10 to the third-party server 11, the duration of the delegation and the conditions associated with the relay device where relevant.

Once this initialization phase has been carried out, the referring server 10 sends to the relay device 20 a request M1 for activation of the relay function, more precisely of a filter, for the management of the device 30. This activation request comprises information relating to rights assigned to the third-party administration server 11 for a delegation of the management of the device 30. More precisely, this activation request M1 comprises, amongst other things:

an identifier of the device to be managed, in particular an IP address allowing it to be contacted;

rights assigned to a third-party server in the framework of the delegation, that the relay function has to verify;

an address of the third-party server 11;

where relevant, one or more conditions associated with the relay device, to be verified by the latter;

where relevant, a policy to be applied when the rights are not respected. In one particular embodiment, a default policy is defined for the implementation of the relay function. This policy aims to define the actions complementary to the filtering that the relay device has to carry out when it receives a message which does not conform to the rights assigned to the third-party administration server in the framework of the delegation. These actions correspond for example to saving the message in a history of filtered messages, to saving the message for later processing, to sending an alert to the referring server 10, to disabling the relay function.

In one particular embodiment, the information relating to rights assigned to the third-party administration server comprises a part of a data model exposed by the device to be managed, for which the third-party server 11 disposes of these rights.

In one particular embodiment, the information relating to rights assigned to a third-party administration server furthermore comprise an authorized administration operation. It is recalled that, in this embodiment, by default all the administration operations are prohibited and that only the operations explicitly mentioned are authorized.

In one particular embodiment, the data model exposed by the relay device comprises specific parameters for the implementation of the relay function and the activation request conforms to the administration protocol used (CWMP in the embodiment described). In another particular embodiment, the relay device exposes an applications programming interface (or API) for example in the form of a Web service that interfaces with an access protocol SOAP (for "Simple Object Access Protocol") and/or Rest (for "Representational State Transfer"), or of a messages-oriented data bus (or "Message-oriented middleware") in a Publish-Subscribe mode of operation, for example using the messaging protocol MQTT (for "Message Queuing Telemetry Transport").

This request M1 for activation of the relay function is received by the relay device 20 in a step E1. When the activation request M1 comprises one or more conditions to be verified, the relay device 20 verifies that this or these conditions are met. If this is not the case, the activation request is refused. Again in this step E1, the relay device 20 activates the relay function for this device to be managed 30. More precisely, the relay device 20 instantiates the second and third relay administration modules. Then, the relay device 20 defines a filter to be applied to the messages received from the third-party server 11 for managing the device 30 according to the rights assigned to the third-party server 11 and to the policy received where relevant. This filter allows a message received to be blocked or modified when it does not conform to the rights assigned to the third-party administration server in the framework of the delegation. In one particular embodiment, the filter to be applied is also defined for the messages received from the device to be managed 30 destined for the third-party server 11. Once the relay function has been activated, the relay device 20 notifies the referring server 10 of the execution of the activation request.

The referring server 10 then notifies the device to be managed 30 of a change of administration server. More precisely, it sends a notification M2 to the device to be managed 30 indicating that the administration operations will henceforth be carried out by the third relay administration module AB. This notification M2 conforms to the administration protocol used. For example, this message M2 corresponds, for the protocol CWMP, to a command "Set Parameter Value" on the parameter "Device.ManagementServer.URL" specifying the network address of the third relay administration module AB. It may also correspond to a request sent by the referring server 10 to the device to be managed 30.

It is highlighted here that the referring server 10 cannot carry out remote administration operations on the device 30, even for operations outside of the delegation. This is because, at a given time, the device to be managed 30 only knows one administration server. This notification M2 is received by the device 30 in a step F1.

Once these message exchanges have been carried out, the various devices and servers are configured so as to allow a management of the device 30 by the third-party server 11 and by means of the relay function implemented by the relay device 20, within the perimeter of the delegation accorded by the referring server 10 to the third-party server 11.

The relay function implemented by the relay device 20 for the communication of the device to be managed 30 with the third-party server 11 is implemented in the following manner The relay device 20 receives a message M3 coming from the device to be managed 30. More precisely, the message M3 is received by the third relay administration module AB, the latter playing the role of the administration server for the device 30. This message is for example a message for establishing an administration session conforming to the administration protocol used. More precisely, for the CWMP protocol, the device 30 establishes a session with the third relay administration module AB introducing itself with an event "0 BOOTSTRAP". Here, it is recalled that this is an illustrative example and that the method described is implemented for any type of message M3 transmitted by the device 30 to its current administration server (the third relay administration module AB in the case described).

This message M3 is received by the relay device 20 in a step E2. In this step E2, the relay device 20 applies the filter in order to verify that the message M3 conforms to the rights assigned to the third-party server. If such is the case, the message M3 is re-transmitted in the form of a message M4 by the second relay administration module RB to the third-party server 11. In the opposite case, the message M3 is filtered by the relay device 20. The message M3 may thus be blocked or else modified by eliminating parts of the data model that do not conform to the rights assigned to the third-party server, in order for it to conform to these rights. The modified message M3 is re-transmitted in the form of a message M4 by the second relay administration module RB to the third-party server 11. Depending on the applicable policy, an action complementary to the filtering of the message may be implemented by the relay device 20.

The relay function implemented by the relay device 20 for the communication from the third-party server 11 to the device to be managed 30 is implemented in the following manner The third-party server 11 sends a message M5 to the relay device, more precisely to the second relay administration module RB. It is highlighted here that the CWMP protocol such as specified in the report TR-069 defines that the communication is always upon the initiative of the device 30, and that the command coming from the server is transmitted within the response. The response comprises a command Set Parameter Values on parameters of the data model. However, this message M5 may also correspond to a message "6 CONNECTION REQUEST" allowing the device 30 to be forced to establish an administration session. This message M5 is received by the relay device 20 in a step E3. Again during this step E3, the relay device 20 applies the filter in order to verify that the message M5 conforms to the rights assigned to the third-party server 11. If such is the case, the message M5 is re-transmitted in the form of a message M6 by the third relay administration module AB to the device to be managed 30. In the opposite case, the message M5 may be blocked by the relay device 20 or else modified by removing parts of the data model that do not conform to the rights assigned to the third-party server, in order for it to conform to these rights. In this case, the filtered message M5 is re-transmitted in the form of a message M6 by the third relay administration module AB to the device to be managed 30. Depending on the applicable policy, an action complementary to the filtering of the message may be implemented by the relay device 20.

This filtering is implemented by the relay device 20 for any message received from the third-party server 11 destined for the device to be managed 30 (step E3) and, where relevant, for any message received from the device to be managed 30 destined for the third-party server 11 (step E2). It remains active for as long as a delegation period has not expired or for as long as the referring administration server has not requested the disabling of the relay function or else, where relevant, for as long as the conditions are satisfied. The delegation period may be defined by default or else transmitted within the activation request M1. In one particular embodiment, the relay device 20 verifies on a regular basis that the condition or conditions received in the activation request are met. If this is not the case, the filter is disabled.

At the end of the delegation period, the filter is disabled. This disabling of the filter and the return to the nominal situation are described later on.

Figure 2B:
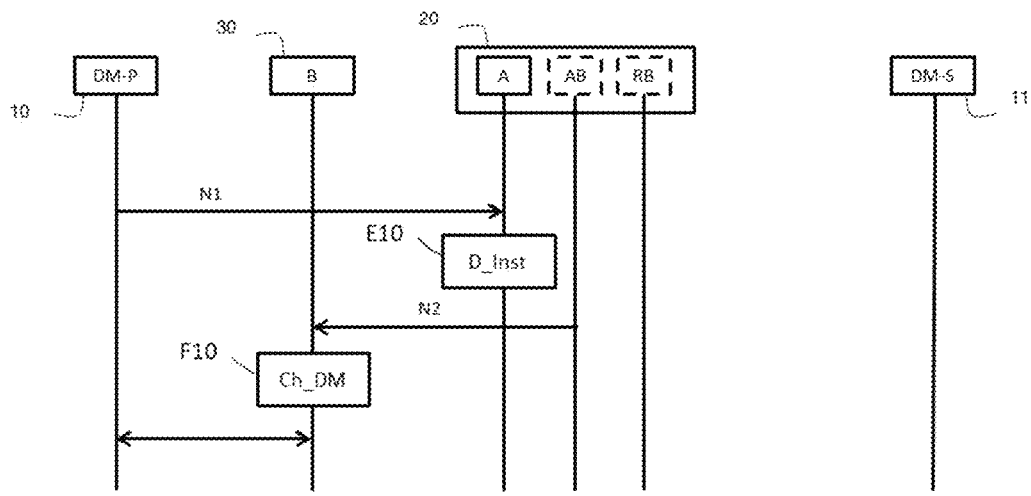
FIG. 2B illustrates steps of a method for remote management of a device according to one particular embodiment.

Steps of the method for remote management of a device 30 are described in relation with FIG. 2B according to one particular embodiment. More precisely, this FIG. 2B illustrates the disabling of the relay function when it is initiated by the referring administration server 10, for example in order to perform another higher-priority administration operation (a security operation for example).

The referring server 10 sends to the relay device 20 a request to disable N1 the relay function, more precisely the filter, for the management of the device 30. In accordance with what has previously been described in relation with FIG. 2A for the activation of the relay function, the disabling may be requested by a protocol message conforming to the administration protocol used, when the data model exposed by the relay device comprises specific parameters for the implementation of the relay function or else by the programming interface, such as previously described in relation with the activation request M1.

This request N1 is received by the relay device 20, more precisely by the first administration module A, in a step E10. Still in this step E10, the relay device 20, more precisely the third relay administration module AB, notifies the device 30 of a change of administration server. More precisely, it sends a notification N2 indicating that the administration operations will henceforth be carried out by the referring administration server 10. This notification N2 conforms to the administration protocol used. This notification N2 is similar to the notification M2 previously described. The relay device 20 also disables the relay function, more precisely, the applied filter and the second and third relay administration modules which had been instantiated.

This notification N2 is received by the device 30 in a step F10. The management of the device 30 is henceforth carried out by the referring server 10. The administration system is once again in the nominal situation.

This disabling procedure is also applicable when the relay device 20 triggers a disabling of the relay function, for example when the delegation period has expired or else in the case conditions associated with the relay device are not met. It is triggered autonomously by the relay device 20 rather than by the receipt of a disabling request.

FIGS. 2A and 2B have been described in relation with a device 30 to be managed. When several devices are to be managed by a relay device, then the latter activates for each of the devices a relay function associated with it. The access gateway 20 may for example act as a relay in the management of all of the devices of the local network. This allows the load resulting from the operation on the infrastructure of the operator to be greatly reduced. This is because the latter is no longer responsible for the administration operation, which off-loads its infrastructure both in terms of processor load and of load associated with the protocol exchanges. In addition, the third-party server may depend on the device to be managed. In the local network, several devices may contribute to a Connected Home service, whereas others such as the TV decoder contribute to the TV service. In this example, a third-party server may dispose of the delegation for managing the devices concerned for the Connected Home service, whereas another third-party server disposes of the delegation for managing the devices concerned for the TV service. Similarly, for the same device, a third-party server may dispose of the delegation for managing this device for the Connected Home service during a first delegation period, and subsequently another third-party server may dispose of the delegation for managing this device for another service during a second delegation period.

It is highlighted here that the relay device 20 and the device to be managed 30 may be of the same type (an access gateway acting as relay for the management of another access gateway) or else of a completely different type (such as shown in the environment in FIG. 1). No limitation is attached to the type of these devices.

The delegation via a relay device allows the mutual knowledge between the third-party server and the device to be managed to be rendered anonymous. The third-party server does not dispose of the address allowing the device to be managed to be contacted and has no visibility on parts of the data model for which the rights are not assigned to it by virtue of the filtering in the uplink direction of communication (from the device to the server). Similarly, the device to be managed does not dispose of the address allowing the third-party server to be contacted: it only disposes of that of the relay device.

Lastly, the relay function may also take responsibility for the protocol adaptations which would be necessary for managing a device not supporting the administration protocol of the third-party server. This may be the case for connected objects which support administration protocols different from that supported by the device, such as LWM2M for certain types of connected objects referred to as constraints (for example since they do not support the protocol TCP/IP), or proprietary protocols.

Figure 3:
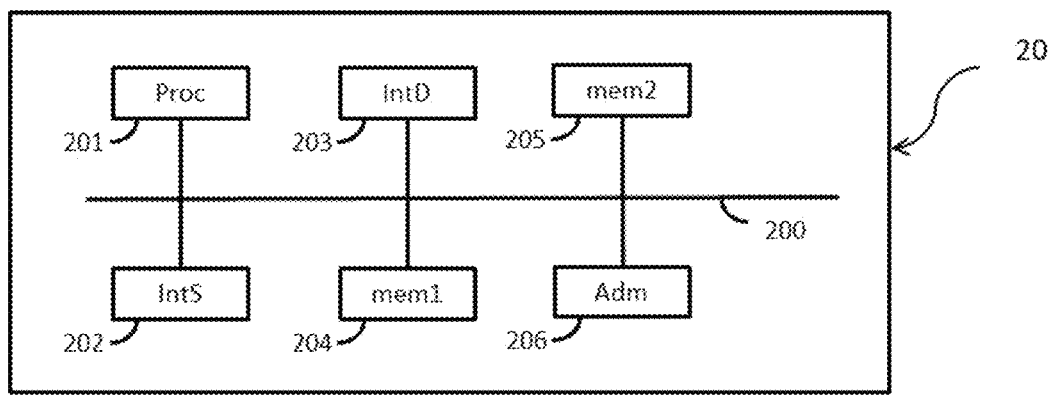
FIG. 3 shows a relay device in one particular embodiment.

FIG. 3 illustrates schematically a relay device 20 configured so as to be managed remotely by a referring administration server in one particular embodiment. The relay device 20 notably comprises:

- a hardware processor 201 for executing code instructions of software modules;
- a memory area 204, configured for storing a program which comprises code instructions for implementing steps of the method for remote management of a device to be managed;
- a storage memory 205, configured for storing data used during the implementation of the method for remote management of a device to be managed, such as parameters used for calculations performed by the processor 201, intermediate data for calculations carried out by the processor 201, etc;
- a first network interface 202;
- a second network interface 203;
- an administration module 206;
which are connected together through a bus 200.

The elements composing the relay device may of course be connected to a connection means other than a bus.

The processor 201 controls the operations of the relay device. The memory area 204 stores at least one computer program code which, when it is executed by the processor 201, implements the various functions of the relay device, in particular the relay function. The processor 201 may be formed by any appropriate hardware or software, or by a combination of hardware and software. For example, the processor 201 may be formed by dedicated hardware such as a processing circuit, or by a programmable processing unit such as a central processing unit (or CPU) which executes a program stored in a memory of the latter.

The memory area 204 may be formed by any given appropriate means capable of storing the program in a manner readable by a computer. Examples of memory area 204 comprise non-volatile storage media readable by computer such as semiconductor memory, and magnetic, optical or magneto-optical recording media loaded into a read and write unit. The program causes the processor 201 to execute a method for remote management of a device according to one particular embodiment.

A first interface network 202 provides a connection between the relay device 20 and an administration server, referring 10 or third-party 20, by means of a communications network relying on an underlying access network. The first interface network 202 may provide, depending on its nature, a wired or wireless connection.

A second interface network 203 provides a connection between the relay device 20 and a device to be managed, by means of a communications network relying on an underlying access network. The second interface network 203 may provide, depending on its nature, a wired or wireless connection.

The first interface network 202 is configured to receive a request for activation of a filter for the management of a device to be managed coming from the referring administration server, this activation request comprising information relating to rights assigned to a third-party administration server 11 for a delegation of the management of the device to be managed.

The administration module 206 is configured for remotely managing the relay device in relation with the referring administration server. The administration module 206 notably comprises the functional module previously described, in other words the first administration module, denoted A, responsible for managing the relay device 20.

The administration module 206 is furthermore configured for processing such an activation request received from the referring server and for applying a filter to a message received from the third-party administration server destined for the device to be managed, the message received from the third-party administration server being filtered by the filter when it does not conform to the rights assigned to the third-party administration server.

The administration module 206 notably comprises, once the relay function has been activated, the two functional modules previously described: the second relay administration module, denoted RB, which plays the role of a client with respect to the third-party administration server 11 for managing the device to be managed B and the third relay administration module to the device to be managed B, denoted AB, which plays the role of an administration server for managing the device B.

In one particular embodiment, the administration module 206 is also configured for applying the filter to a message received from the device to be managed and destined for the third-party administration server, the message received being filtered by the filter when it does not conform to the rights assigned to the third-party administration server.

In one particular embodiment, the administration module 206 is also configured for managing a delegation period, included within the activation request, at the end of which the filter is disabled.

In one particular embodiment, the administration module 206 is also configured for managing a condition associated with the relay device and received in the activation request and for refusing or stopping the activation when this condition is not met.

In one particular embodiment, the administration module 206 is also configured for sending to the device to be managed a change of administration server to the referring administration server for disabling the filter.

In one particular embodiment, the filter blocks a message received when it does not conform to the rights assigned to the third-party administration server or removes parts of the message received not conforming to the rights assigned to the third-party administration server.

It is highlighted here that the relay device 20 also comprises other processing modules, not shown in FIG. 3, arranged for implementing the various device functions.

The implementation of this relay could be carried out as a dormant and inactive service by default in the onboard software by the devices to be managed, for example connected objects, managed by the operator and capable of supporting it.

The technique for remote management of a device is implemented by means of software and/or hardware components. In this respect, the term "module" may correspond, in this document, both to a software component and to a hardware component or to an assembly of software and/or hardware components, capable of implementing a function or a set of functions, according to what has previously been described for the module in question.

A software component corresponds to one or more computer programs, one or more sub-programs of a program, or more generally, to any element of a program or of a software application. Such a software component is stored in memory then loaded and executed by a data processor of a physical entity and is able to access the hardware resources of this physical entity (memories, recording media, communication bus, input/output electronic cards, user interfaces, etc).

In the same manner, a hardware component corresponds to any element of a hardware assembly. This may be a hardware component that is programmable or otherwise, with or without integrated processor for the execution of software. This could for example be an integrated circuit, a smart card, an electronic card for the execution of firmware, etc.

In one particular embodiment, the relay device 20 is configured for implementing steps of the method for remote management of a device, implemented by a relay device. These are preferably software modules comprising software instructions for executing the steps (or actions) of the method for remote management of a device previously described, implemented by a relay device. The invention therefore also relates to:
- a program for a relay device, comprising program code instructions for controlling the execution of the steps (or the actions) of the method for remote management of a device previously described, when said program is executed by this relay device;
- a recording medium readable by a relay device on which the program for a relay device is recorded.

The software modules may be stored in or transmitted by a data medium. This may be a hardware storage medium, for example a CD-ROM, a magnetic floppy disk or a hard disk, or else a transmission medium such as an electrical, optical or radio signal, or a telecommunications network.

The invention therefore also relates to a relay device configured so as to be managed remotely by a referring administration server, said device comprising a processor configured for:
- receiving a request for activation of a filter for the management of said device coming from a referring administration server 10, said activation request comprising information relating to rights assigned to a third-party administration server 11 for a delegation of the management of the device to be managed;
- applying the filter to a message received from the third-party administration server destined for the device to be managed, the message received from the third-party administration server being filtered by the filter when it does not conform to the rights assigned to the third-party administration server.

Although the present disclosure has been described with reference to one or more examples, workers skilled in the art will recognize that changes may be made in form and detail without departing from the scope of the disclosure and/or the appended claims.

The invention claimed is:

1. A method for remote management of a device to be managed, said method comprising:
   receiving by a relay device a request for activation of a filter for the management of said device coming from a referring administration server, said activation request comprising information relating to rights assigned to a third-party administration server for a delegation of the management of the device to be managed; and
   applying the filter by the relay device to a message received from the third-party administration server destined for the device to be managed, comprising verifying whether the message received from the third-party administration server conforms to the rights assigned to the third-party administration server and removing parts of the message identified as not conforming to the rights assigned to the third-party administration server.

2. The method as claimed in claim 1, furthermore comprising applying the filter to a message received from the device to be managed destined for the third-party administration server, the message received from the device to be managed being filtered by the filter in response to the message received from the device to be managed not conforming to the rights assigned to the third-party administration server.

3. The method as claimed in claim 1, in which the activation request comprises a delegation period, at an end of which the filter is disabled.

4. The method as claimed in claim 1, in which the activation request comprises a condition associated with the relay device and the method comprises the relay device no activating or disabling the filter in response to said condition being not met.

5. The method as claimed in claim 1, furthermore comprising, for disabling the filter, sending by the relay device to the device to be managed a change of administration server to the referring administration server.

6. The method as claimed in claim 1, in which the information relating to rights assigned to the third-party administration server comprises a part of a data model exposed by the device to be managed, for which the third-party administration server disposes of said rights.

7. The method as claimed in claim 1, in which the information relating to rights assigned to a third-party administration server furthermore comprises an authorized administration operation.

8. A relay device, configured so as to be managed remotely by a referring administration server, said relay device comprising:
   a processor; and
   a non-transitory computer-readable medium comprising instructions stored thereon which when executed by the processor configure the relay device to:
      receive a request for activation of a filter for the management of a device to be managed coming from the referring administration server, said activation request comprising information relating to rights assigned to a third-party administration server for a delegation of the management of the device to be managed; and
      apply a filter to a message received from the third-party administration server destined for the device to be managed, comprising verifying whether the message received from the third-party administration server conforms to the rights assigned to the third-party administration server and removing parts of the message identified as not conforming to the rights assigned to the third-party administration server.

9. An administration system comprising:
   a referring administration server;
   a third-party administration server; and
   a relay device, configured so as to be managed remotely by the referring administration server, said relay device comprising:
      a processor; and
      a non-transitory computer-readable medium comprising instructions stored thereon which when executed by the processor configure the relay device to:
         receive a request for activation of a filter for the management of a device to be managed coming from the referring administration server, said activation request comprising information relating to rights assigned to the third-party administration server for a delegation of the management of the device to be managed; and
         apply a filter to a message received from the third-party administration server destined for the device to be managed, comprising verifying whether the message received from the third-party administration server conforms to the rights assigned to the third-party administration server and removing parts of the message identified as not conforming to the rights assigned to the third-party administration server.

10. A non-transitory computer-readable recording medium on which a program is recorded, the program comprising program code instructions for controlling execution of a method for remote management of a device to be managed when the program code instructions are executed by a processor of a relay device, wherein the method comprises:
   receiving by the relay device a request for activation of a filter for the management of said device coming from a referring administration server, said activation request comprising information relating to rights assigned to a third-party administration server for a delegation of the management of the device to be managed; and
   applying the filter by the relay device to a message received from the third-party administration server destined for the device to be managed, comprising verifying whether the message received from the third-party administration server conforms to the rights assigned to the third-party administration server and removing parts of the message identified as not conforming to the rights assigned to the third-party administration server.

* * * * *